United States Patent

Wenner

[15] 3,666,202

[45] May 30, 1972

[54] SINGLE REEL MAGNETIC TAPE UNIT

[72] Inventor: John W. Wenner, Boulder, Colo.

[73] Assignee: International Business Machines Corporation, Armonk, N.Y.

[22] Filed: Aug. 13, 1970

[21] Appl. No.: 63,350

[52] U.S. Cl. ................................ 242/182, 242/192, 242/197

[51] Int. Cl. ................ G11b 15/32, G11b 15/58, G11b 23/10

[58] Field of Search .................. 242/182, 183, 184, 185, 192, 242/197.7; 226/55.01

[56] References Cited

UNITED STATES PATENTS

| | | | |
|---|---|---|---|
| 2,995,313 | 8/1961 | Namenyi-Katz | 242/182 X |
| 3,106,355 | 10/1963 | Warren | 242/55.01 |

*Primary Examiner*—George F. Mautz
*Assistant Examiner*—Edward J. McCarthy
*Attorney*—Hanifin and Jancin and Francis A. Sirr

[57] ABSTRACT

A standard 9-track, half-inch, 300-foot mini-reel of magnetic tape, having a relatively large endless polyethylene belt loosely encircling the tape, is inserted into a cartridge have a U-shaped vacuum column portion. The side walls of the vacuum column converge as they extend away from the reel, and an opening is formed in the back surface of the vacuum column. The reel mounts on a vacuum activated reel latch to accurately position the reel and loosely position the cartridge adjacent to reference plate. When the reel is so positioned, the open back of the vacuum column is held against the reference plate by the vacuum opening in the reference plate. A vacuum source both actuates the reel latch, to couple the tape reel to a reversible drive motor, and pulls the endless belt into the vacuum column. Forward rotation of the motor causes a fundamental band of magnetic tape, of increasing layer thickness, to be established in the vacuum column, the inner surface of the endless belt establishing the outer layer of the fundamental band. A magnetic transducer is mounted on the reference plate in a position to contact with the inner layer of the fundamental band. A spring provides a light contact force to oppose the frictional force between the cartridge, and the reference plate and to cause slight rotation of the cartridge about the reel axis when a rewind mode is initiated, to allow high speed rewind with the tape out of contact with the transducer.

12 Claims, 6 Drawing Figures

INVENTOR
JOHN W. WENNER
BY
[signature]
ATTORNEY

SINGLE REEL MAGNETIC TAPE UNIT

BACKGROUND AND SUMMARY OF THE INVENTION

The present invention relates to the field of magnetic tape units which selectively move magnetic tape and are utilized to both write and read digital data. Such tape units are of two general types. In the first type, the tape moves between a replaceable file reel and a machine reel. In the second type, only one reel is utilized, the tape leaving the reel, passing through a tape processing station, and returning to the reel, as an endless loop. The present invention relates to this second type of tape unit.

Prior art single reel tape units, or handlers, have taken a variety of configurations. The primary objections to prior art handlers of this type are that the tape must pass through a complicated, tortuous path before returning to the tape reel, the tape must be fed from the inside surface and returned to the outside surface of the tape reel, the tape usually cannot be reversed or rewound and normally one must run through the entire reel in order to return to the beginning of the tape.

The present invention overcomes the problems found in the prior art by means of a unique structural combination of a standard tape reel, a reel cartridge having an integral vacuum column, means such as an endless flexible belt to establish a single fundamental band of magnetic tape of increasing layer thickness as the reel rotates in a forward direction, or decreasing layer thickness as the reel rotates in a backward direction, and a magnetic head or transducer mounted to contact the continuously changing portion of magnetic tape which occupies the inner layer of the fundamental band.

Additional features of the present invention include, without limitation, a vacuum actuated reel latch and vacuum means to seat the tape reel on the drive hub, a reference plate having a vacuum port cooperating with the lower portion of the vacuum column to communicate vacuum thereto and thus cause the flexible belt to generally conform to the U-shape of the vacuum column and to hold the cartridge and its vacuum column against the reference plate, and light spring loaded force means to bias the cartridge for movement away from the head. Upon a command for high speed rewind, the vacuum source is momentarily interrupted, reducing the friction force between the vacuum column and the reference plate, to allow the force means to move the tape away from the head during the subsequent high speed movement of the tape.

The foregoing and other objects, features, and advantages of the invention will be apparent from the following more particular description of preferred embodiments of the invention, as illustrated in the accompanying drawings.

BRIEF DESCRIPTION OF THE DRAWINGS

Referring to FIG. 1, a generally flat reference plate 10 supports reel drive motor 11. Motor 11 is a reversible motor and its shaft 12 is connected to a reel drive hub and latch 13.

Figure 1:
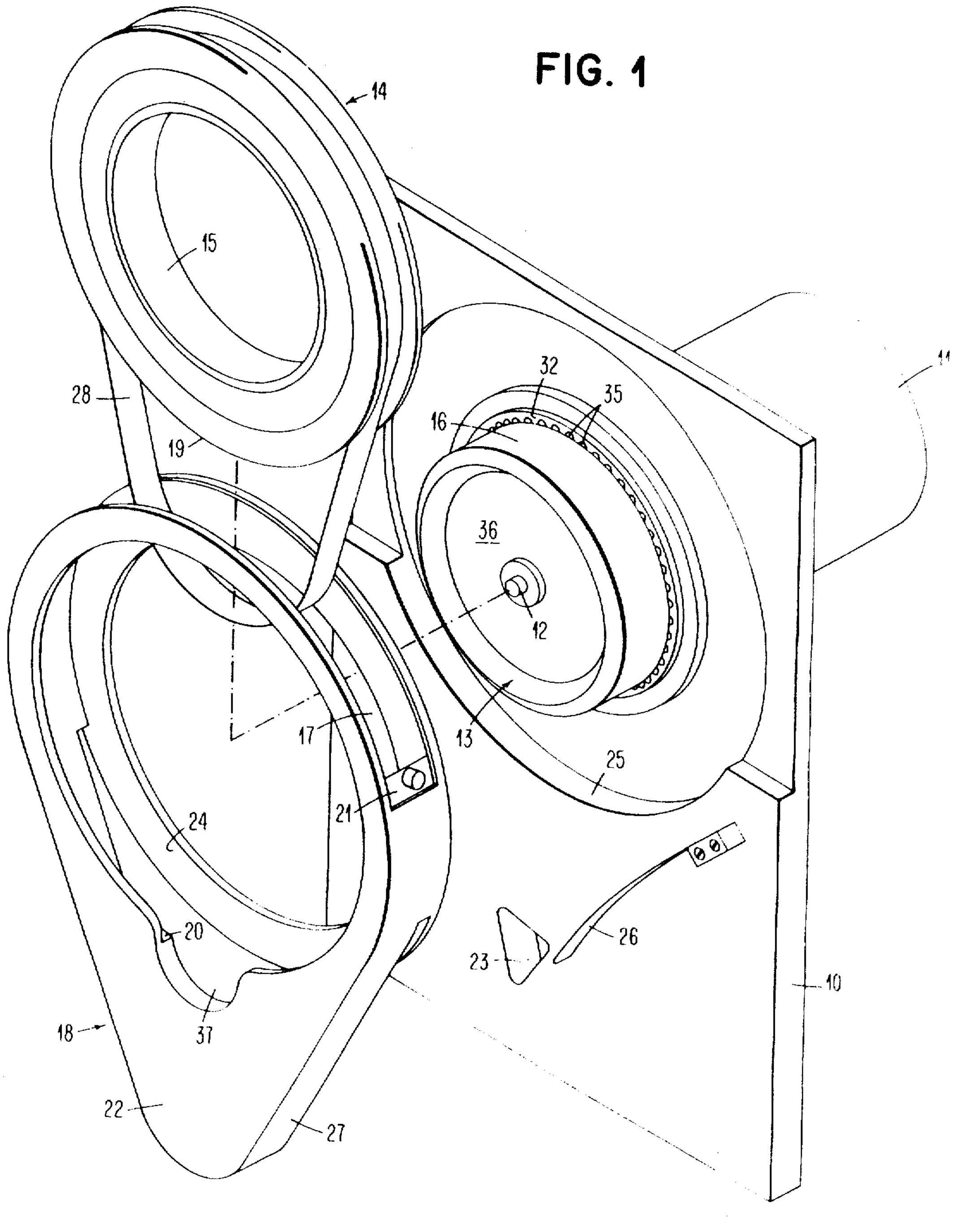
FIG. 1 is a perspective view of the magnetic tape unit of the present invention, showing the tape reel displaced from the access slot in the cartridge, and showing the cartridge displaced from the drive hub, reel latch, and reference plate.

Reel 14 is a standard mini-reel, holding approximately 300 feet of ½-inch magnetic tape, normally containing 9 tracks of digital data. The central mounting opening 15 of reel 14 is slightly larger than the expandable annular band 16 which is mounted on and rotates with drive hub 13. Thus, reel 14 may be loosely positioned upon drive hub 13, as will be explained.

Reel 14 is shown disposed above an access opening 17 formed in cartridge 18. Once reel 14 is dropped into cartridge 18, reel flange 19 locates against shoulder 20 in cartridge 18 to limit the downward movement of reel 14. Access door 21 is then moved to close opening 17 in cartridge 18. The endless strip of flexible material 28, such as a polyethylene, loosely extends into a vacuum column portion 22 of cartridge 18. As can be seen, the back side of vacuum column portion 22 of cartridge 18 is open and is adapted to seat against the front surface of reference plate 10 in the vicinity of vacuum portion 23.

When cartridge 18 is placed in position on reference plate 10, the annular portion 24 of cartridge 18 cooperates with the annular portion 25 of the reference plate 10 to aid in locating the cartridge on the reference plate. Also, when cartridge 18 is in this position, the central mounting opening 15 of reel 14 is positioned on drive hub 13 such that expandable band 16 is loosely associated with the central mounting opening 15 of the reel. Cartridge 18 is now loosely supported by annular surface 25 and is free to rotate about the axis of reel 14, as established by shaft 12 of motor 11. A cartridge bias spring 26 engages the outer surface of the U-shaped vacuum column portion of cartridge 18, in the vicinity of the area 27.

Figure 2:
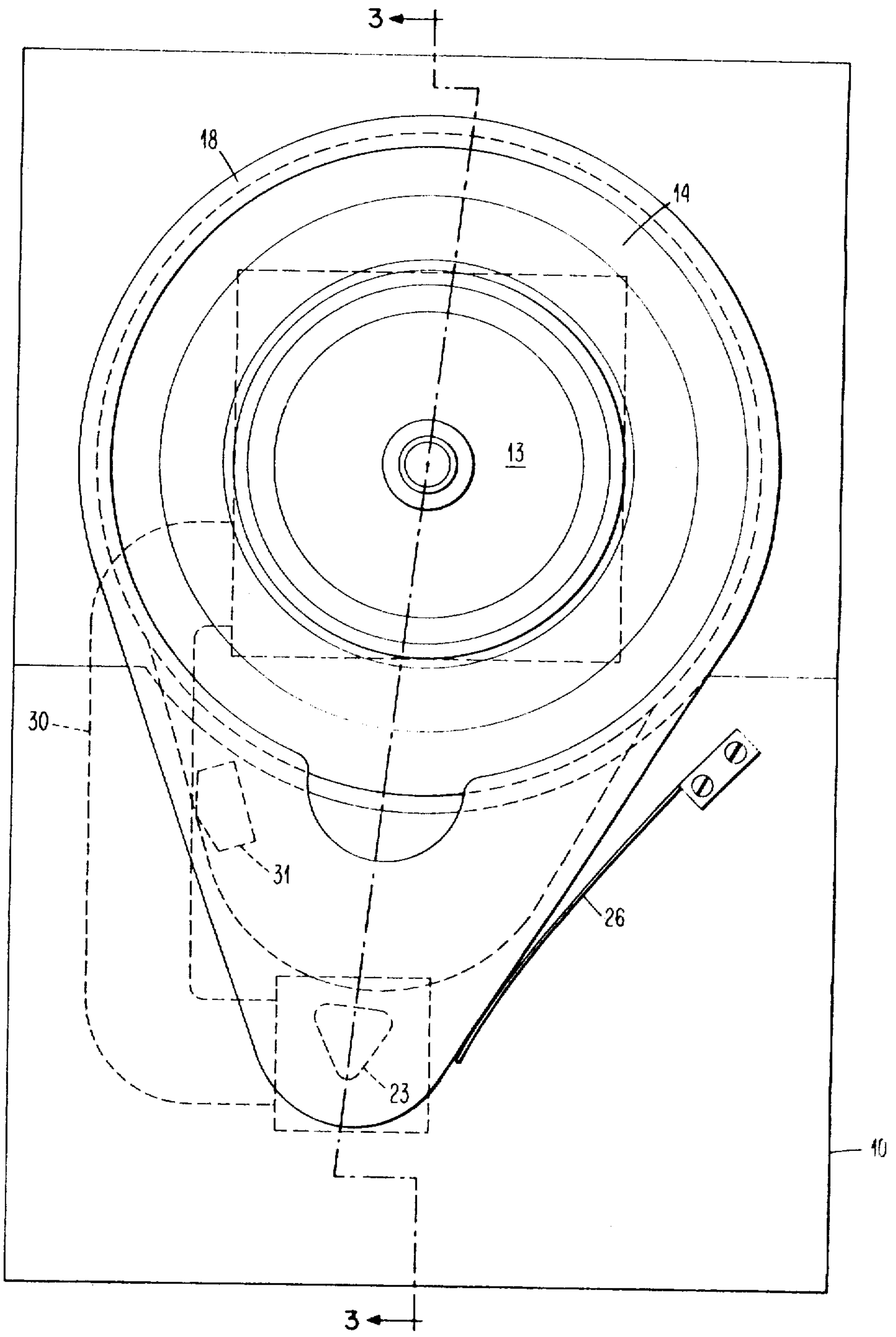
FIG. 2 is a front view of the unit of FIG. 1 showing the reel and cartridge in place on the drive hub, and showing, in broken lines, portions of the vacuum system.

Referring to FIG. 2, the broken lines 30 define a vacuum system which is associated with the vacuum column port 23 formed in reference plate 10 and with reel drive hub and latch 13. Also shown in this Figure is a magnetic transducer or head 31. In this Figure, the vacuum source has been activated to hold the cartridge against the reference plate. Cartridge 18 has been manually rotated in a counterclockwise direction until head 31 engages the inner surface of belt 28. Cartridge 18 now remains in this position due to the friction force between the cartridge and the reference plate. Belt 28 is shown in an extended position, drawn into the U-shaped portion of the vacuum column by the vacuum force exerted through port 23.

Referring again to FIG. 1, drive hub 13 includes an axially moveable, vacuum actuated, tape reel latch member 36 in the form of an axially moveable disc which, under the force of vacuum, moves in the direction of motor 11, expanding member 16 and coupling reel 14 to drive hub 13 through engagement of the outer surface of member 16 with reel drive surface 15. Drive hub 13 includes an annular positioning shoulder 32 which defines the proper axial position of reel 14. Once the cartridge and reel are positioned on reference plate 10, and vacuum system 30 is activated, the vacuum force is effective to accomplish three functions. The first function is to induce air flow through slot 37 formed in vacuum column 22 thus causing belt 28 to assume the position shown in FIG. 2. The second function is to create a vacuum force such that cartridge 18 is pulled firmly against the adjacent surface of reference plate 10, establishing a friction force between cartridge 18 and the reference plate which resists rotational movement of cartridge 18 about shaft 12. The third function is to induce a relatively large rate of flow through a plurality of vacuum holes 35 formed in shoulder 32 of drive hub 13. Until such time as reel 14 is firmly positioned against shoulder 32, disc 36 does not move to expand member 16. The air flow thru holes 35 causes reel 14 to be drawn axially toward motor 11, to seat against shoulder 32, closing vacuum ports 35. Once these ports are closed, sufficient vacuum force is exerted on disc 36 to cause this disc to move axially in the direction of motor 11, expanding belt 16 and coupling reel 14 to drive hub 13.

Figures 3, 6:
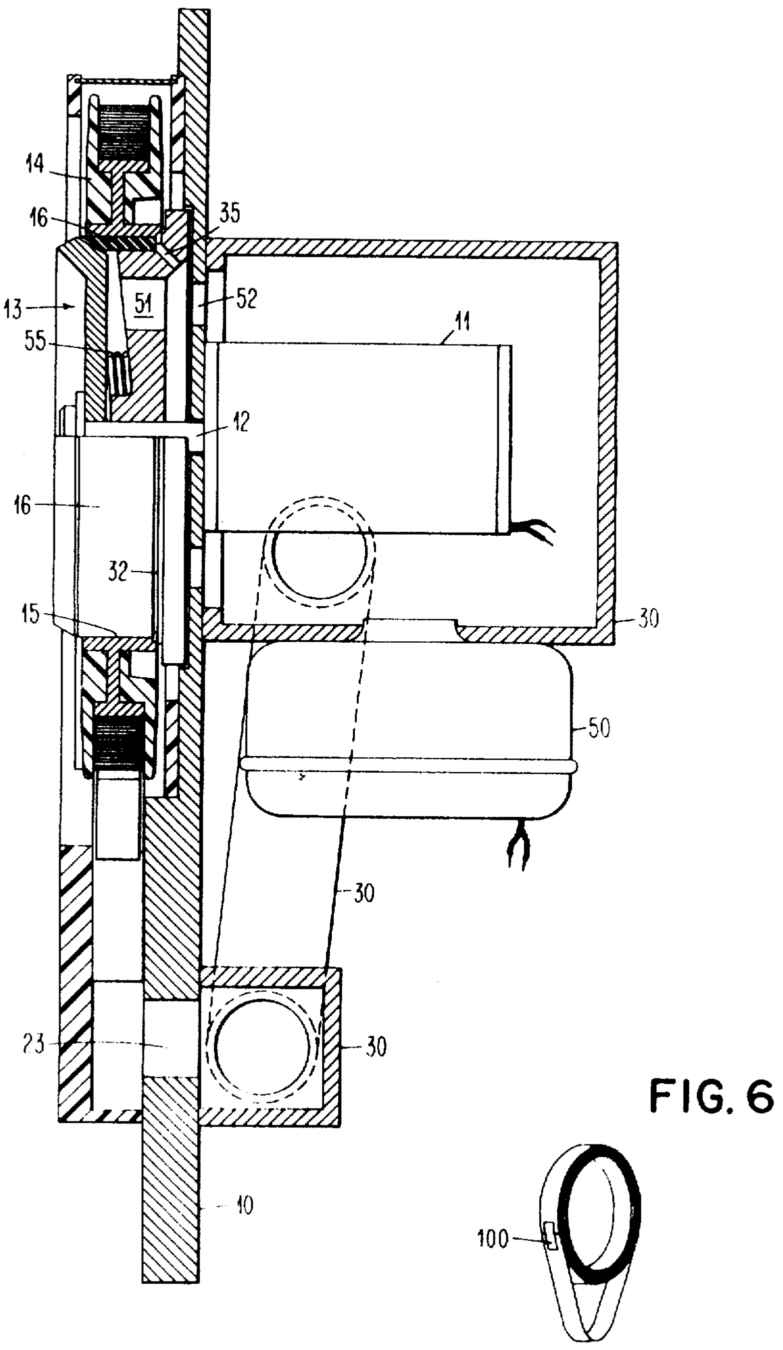
FIG. 3 is a side section view of the unit of FIG. 2, taken along the line 3—3 of FIG. 2.
FIG. 6 shows a means for establishing the fundamental band of tape by means of an adhesive tab which fastens the end of the tape to the adjacent underlying layer of tape.

FIG. 3 more completely shows the details of the structure above described. Referring to this Figure, it can be seen that a vacuum pump 50 supplies vacuum force to a manifold which encircles drive motor 11. This manifold communicates with vacuum ports 35 in hub 13 and with moveable disc 36 by way of openings 51 and 52. This manifold is connected by a conduit to a second manifold which is associated with vacuum port 23 formed in the lower portion of base member 10. This Figure also shows the detailed structure of drive hub 13 and the vacuum actuated reel latch mechanism. As shown in FIG. 3, tape reel 14 is seated against shoulder 32 and the plurality of openings 35 are effectively sealed. Disc 36 is shown in its axially extended position, to which position it is biased by means of spring 55. However, vacuum force is applied to the back side of disc 36 and this disc now moves axially to the right, engaging expandable ring 16, causing this ring to expand to engage surface 15 of reel 14, thus coupling reel 14 to drive hub 13.

Figure 4:
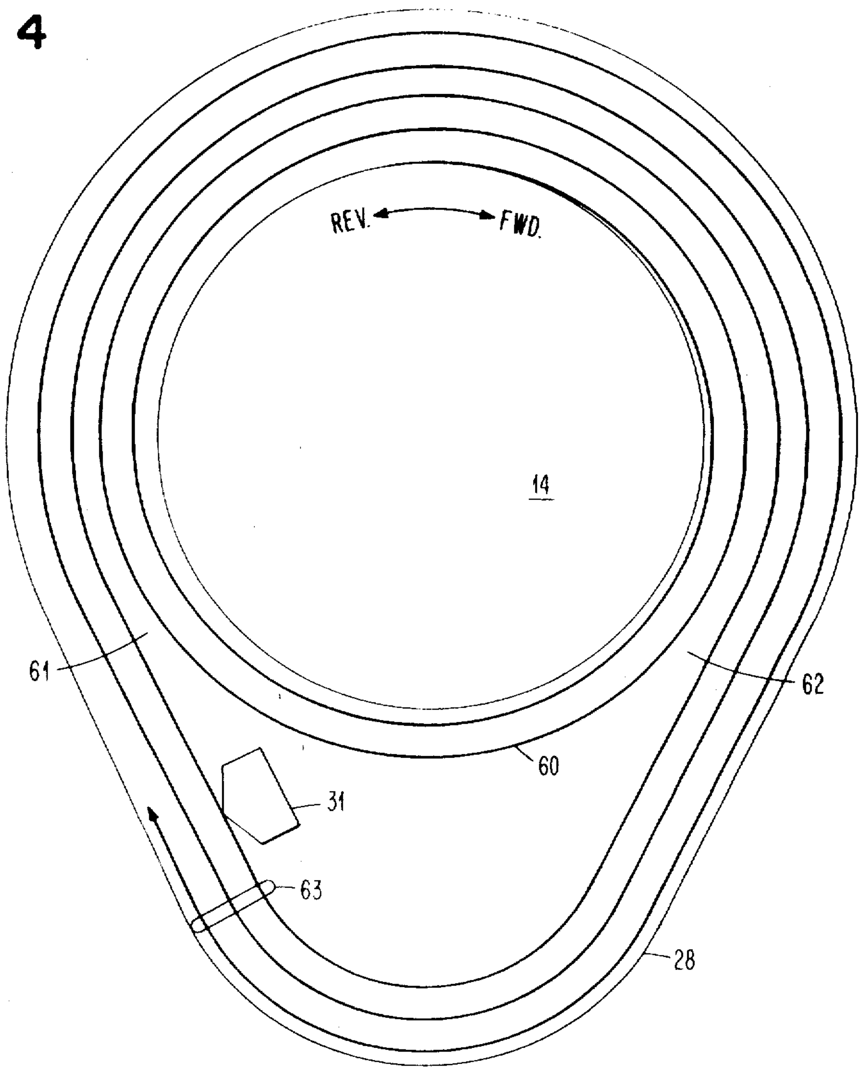
FIG. 4 is a diagrammatic view of a fundamental band of magnetic tape.

Referring to the diagrammatic showing of FIG. 4, it can be seen that magnetic tape 60 is wound in a clockwise direction about the reel. To simplify this Figure, both belt 28 and tape 60 do not have a thickness, and are represented by a single line. The magnetic recording surface on this tape faces the inwardly disposed central axis of reel 14. Clockwise rotation of motor 11 is considered to be the forward direction of rotation whereas counter-clockwise rotation of motor 11 is considered to be the backward/rewind direction of movement of the tape.

When motor 11 rotates in a forward direction, the first layer of tape on reel 14 leaves the concentric surface of the tape on reel 14 and follows the moving surface of belt 28 into the vacuum column. As rotation of motor 11 continues, this moving end of the tape returns to the reel at a position 61 which is displaced less than 180° from the point 62 at which the end of the tape left the reel. As the end of tape moves in this path, it passes in cooperating relationship with head 31 and thus digital data which is recorded on the inner surface of the tape can be read by the head, or conversely, digital data may be written on this surface of the tape by digital data supplied to the head. As motor 11 continues to rotate in the clockwise direction, the layer thickness of this fundamental band 63 of magnetic tape, which is established by flexible band 28, continues to increase, head 31 always cooperating with a different portion of the magnetic surface, namely the inner surface of the inner most layer of the magnetic tape. As the layers of tape build up between the wall of the vacuum column and the head, cartridge 18 rotates, a slight amount, in a clockwise direction about the axis established by shaft 12 of motor 11.

While flexible band 28 is a convenient way to establish the fundamental band of tape, such a band of tape can also be established as shown in FIG. 6 by means of a clip or adhesive tab 100 which can be attached to the end of the tape and then secured to the adjacent layer of tape in a manner to establish a loop such as the loop disclosed in FIG. 4, wherein the tape leaves the reel at one point 62 and returns at another point 61 displaced less than 180° from the first point.

By virtue of the vacuum force induced by port 23, the layers of tape in the fundamental band are maintained under tension. However, should vacuum be lost, the tape is protected in that not only does disc 36 respond to the lack of vacuum by effectively uncoupling reel 14 from hub 13, but also, the vacuum force holding cartridge 18 against reference plate 10, is lost and cartridge bias spring 26 is effective to move cartridge 18 in a clockwise direction about shaft 12, thus providing a space between the inner-most layer of the fundamental band of magnetic tape and the adjacent surface of head 31.

Figure 5:
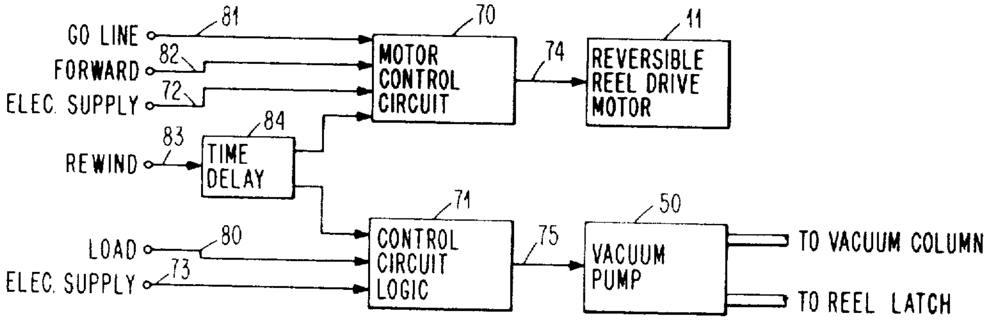
FIG. 5 is a block diagram representation of an electrical control means for the unit of FIG. 1.

An example, without limitation, of an electrical system which may be utilized to control vacuum pump 50 and motor 11 is shown in FIG. 5. In this Figure, a motor control circuit 70 and control circuit logic 71 receive electrical voltage by way of conductors 72 and 73 respectively. The output of motor control circuit 70, which is effective to energize drive motor 11, is present on conductor 74, whereas an output from control circuit logic 71 to energize pump 50 is present on conductor 75.

To institute operation of the magnetic tape unit, a signal is presented to control circuit logic 71 by means of load conductor 80. As a result, vacuum pump 50 is energized, the reel is seated against shoulder 32, the reel latch mechanism is actuated, and cartridge 18 is seated against reference plate 10. A signal is now presented to motor control circuit 70 by means of go line conductor 81 and forward conductor 82, causing clockwise rotation of the reel, to cause the tape on the reel to move past the head, whereupon the writing or the reading process can take place.

When it is desired to rewind the tape, a signal is originated on conductor 83 and the sense of the signal on conductor 82 is inverted. Time delay element 84 is effective to momentarily interrupt the signal on conductor 74 and 75, deenergizing both motor 11 and pump 50. Deenergization of pump 50 is effective to allow cartridge bias spring 26 to move cartridge 18 in a clockwise direction about the axis of the reel so that the tape is now out of engagement with the head. A short time later, both motor 11 and pump 50 are again energized, the motor now rotating at a higher speed in a counterclockwise direction, to rewind the tape onto the reel, this higher speed tape movement occurring with the tape out of engagement with the head.

The preferred embodiment of the present invention is particularly adapted to read or write digital data on the tape while the motor is rotating in the forward direction, and to perform an error recovery procedure by means of a short distance reverse rotation of the motor, this being accomplished by inverting the sense of the signal on conductor 82. However, it is possible to provide a modified form of cartridge bias spring means which maintains the head in contact with the tape for any distance reverse rotation of the motor. This modified form of spring means would allow the cartridge, and thus the tape, to move away from the head during high speed rewind.

While the invention has been particularly shown and described with reference to preferred embodiments thereof, it will be understood by those skilled in the art that various changes in form and details may be made therein without department from the spirit and scope of the invention.

What is claimed is:

1. Single reel magnetic tape unit apparatus, comprising:

means including a magnetic tape storage reel having a strip of magnetic tape wound on said reel such that the magnetic recording surface thereof faces the central axis of said reel;

drive means connected to said reel to reversibly rotate said reel about its axis;

means to establish one composite fundamental band of said magnetic tape, which is of variable layer thickness as said band moves in a path radially displaced from the axis of said reel, whereby said tape leaves said reel at one point and returns at a circumferentially spaced point; and a magnetic transducer mounted within said fundamental band and cooperating with the recording surface of the innermost layer of magnetic tape in said fundamental band.

2. A magnetic tape unit as defined in claim 1 wherein said means to establish said fundamental band is constructed and arranged to cause said tape to leave said reel at a point which is spaced no more than 180° from the point which the tape returns to said reel.

3. A magnetic tape unit as defined in claim 1 wherein said means to establish said fundamental band is provided by fastening the exposed end of said strip of tape to the adjacent underlying layer of tape in a manner to form a single fundamental band of tape which is displaced from the axis of said reel and from said underlying layer of tape.

4. A magnetic tape unit as defined in claim 1 wherein said means to establish said fundamental band includes an endless strip of flexible material having a width appropriately equal to the width of said tape which, without vacuum, is loosely positioned about said reel to enclose said tape, said endless strip forming a single fundamental loop which is displaced from the axis of said reel.

5. A magnetic tape unit as defined in claim 1 wherein said first first named means included a tape reel cartridge having a first portion shaped to generally conform to the shape of said reel, having a vacuum column portion which extends away from the axis of said reel and accommodates said fundamental band of tape therein, and including vacuum means associated with the vacuum column portion of said cartridge to establish a vacuum in said vacuum column portion on the side of said fundamental band opposite said reel.

6. A magnetic tape unit as defined in claim 5 wherein said cartridge is free to rotate about the axis of said reel.

7. A magnetic tape unit as defined in claim 6 including a reference plate and tape reel latch means associated with said drive means to facilitate mounting said reel thereon, wherein said vacuum column portion of said cartridge cooperates with said reference plate such that the vacuum causes said cartridge to engage said reference plate in a manner to seal said vacuum column, and including force bias means associated between said reference plate and said cartridge to facilitate movement of said cartridge about the axis of said reel as the layer thickness of said fundamental band increases.

8. A magnetic tape unit as defined in claim 7 wherein said tape reel latch means includes a radially expandable reel drive member, and means controlled by said vacuum means to expand said reel drive member to couple said reel to said drive means.

9. A magnetic tape unit as defined in claim 7 wherein said drive means includes a positioning surface for the tape reel, and vacuum actuated means controlled by said vacuum means to first seat the tape reel adjacent said positioning surface and to thereafter cause expansion of said reel drive member.

10. A magnetic tape unit as defined in claim 7 including drive control means connected to said drive means and responsive to a first input signal to cause rotation of said reel at a first speed in said one direction, and responsive to a second input signal to cause rotation of said reel at a second higher speed in said opposite direction, and including means responsive to said second input signal to momentarily interrupt said vacuum means, such that said force bias means is thereupon effective to displace the inner-most layer of magnetic tape in said fundamental band from said magnetic transducer during rewind of said reel at said higher speed.

11. A magnetic tape unit as defined in claim 7 wherein said tape reel latch means is vacuum actuated and wherein said reference plate is a relatively flat member having a first opening therein; said tape unit having a drive shaft extending through said first opening to couple to said tape reel latch on one side of said reference plate to said drive means on the other side of said reference plate; wherein said vacuum column portion of said cartridge is a generally U-shaped column having a wall spaced from said one side of reference plate by a distance approximately equal to the width of said tape; wherein said reference plate has a second opening, displaced from said first opening, and positioned to be cooperable with the bottom portion of the U-shaped vacuum column; wherein said magnetic transducer is mounted on said one side of said reference plate; and wherein said vacuum means includes a vacuum pump mounted adjacent said other side of said reference plate, and conduit means connecting said pump to the second opening in said reference plate and to said tape reel latch means.

12. A magnetic tape unit as defined in claim 11 wherein said means to establish said fundamental band includes an endless strip of flexible material having a width approximately equal to the width of said tape, said endless strip being loosely positioned about said reel and having a portion thereof which is radially displaced from said reel into said U-shaped vacuum column to engage the divergent walls thereof and to be subjected to a vacuum force to thus establish the outer-most layer of said fundamental band, and wherein said force bias means is a spring operable between said reference plate and said cartridge to aid in the rotation of said cartridge about said axis as the layer thickness of said fundamental band increases.

* * * * *